(12) United States Patent
Sinnarajah et al.

(10) Patent No.: US 7,373,157 B2
(45) Date of Patent: May 13, 2008

(54) METHOD AND APPARATUS FOR SHORT-SLOT-CYCLE PAGING

(75) Inventors: Ragulan Sinnarajah, Markham (CA); An Mei Chen, San Diego, CA (US); Baaziz Achour, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 608 days.

(21) Appl. No.: 10/620,755

(22) Filed: Jul. 15, 2003

(65) Prior Publication Data

US 2005/0014519 A1   Jan. 20, 2005

(51) Int. Cl.
*H04Q 7/20* (2006.01)
*H04B 7/00* (2006.01)

(52) U.S. Cl. .................. 455/458; 455/515; 455/434

(58) Field of Classification Search ................ 455/458, 455/515, 434, 343, 437, 574, 422, 575, 67.1, 455/566, 415, 465, 563, 414, 466, 567, 518, 455/519, 436, 442, 435, 552.1, 513, 330, 455/334, 337, 332
See application file for complete search history.

(56) References Cited

U.S. PATENT DOCUMENTS 6,253,089 B1 * 6/2001 Schlosser et al. ........... 455/465
6,377,803 B1 * 4/2002 Ruohonen ................... 455/434
6,453,181 B1 * 9/2002 Challa et al. ............... 455/574
6,711,413 B1 * 3/2004 Heidari ....................... 455/515
6,725,042 B2 * 4/2004 Park ........................... 455/436
7,047,005 B2 * 5/2006 Kinnavy ..................... 455/434
2004/0171400 A1 * 9/2004 Rosen et al. ................ 455/518
2004/0179492 A1 * 9/2004 Zhang et al. ............... 370/331

\* cited by examiner

*Primary Examiner*—Naghmeh Mehrpour
(74) *Attorney, Agent, or Firm*—Raphael Freiwirth; Robert J. O'Connell; Thomas Rouse

(57) ABSTRACT

A method and apparatus for providing short-slot-cycle paging information from a communication device (CD) to a base station (BS) includes receiving system parameter messages from the BS, determining whether the BS is capable of short-slot-cycle paging, and indicating that the CD is also capable for short-slot-cycle paging if the BS is determined to be capable of short-slot-cycle paging. A method in a BS for providing short-slot-cycle paging includes indicating to a CD that the BS is capable of short-slot-cycle paging, receiving information from the CD, indicating that the CD is also capable for short-slot-cycle paging, and paging the CD based on the received information.

72 Claims, 11 Drawing Sheets

US 7,373,157 B2

METHOD AND APPARATUS FOR SHORT-SLOT-CYCLE PAGING

FIELD

The present invention relates to point to multi-point communications systems. More specifically, the present invention relates to methods and apparatus for providing short-slot-cycles paging of a group of target mobile stations.

BACKGROUND

In wireless communications systems, registration is the process by which a mobile station notifies a base station of its location, status, identification, slot cycle, and other characteristics. The mobile station informs the base station of its location and status so that the base station can efficiently page the mobile station when establishing a mobile station-terminated call. Paging a mobile station includes the act of seeking the mobile station when a call has been placed to that mobile station. To reduce call set up in some applications, it is desirable to minimize registration and paging cycles.

For example, a class of wireless services intended for quick, efficient, one-to-one or one-to-many (group) communication has existed in various forms for many years. In general, these services have been half-duplex, where a user presses a "push-to-talk" (PTT) button on a phone/radio to initiate a group call. If granted the floor, the talker then generally speaks for a few seconds. After the talker releases the PTT button, other users may request the floor. These services have traditionally been used in applications where one person, a "dispatcher," needs to communicate with a group of people, such as field service personnel or construction site workers, which is where the "dispatch" name for the service comes from. Similar services have been offered on the Internet and are generally known as "voice chat." A key feature of these services is the desirability of quick call set ups. Therefore, registration and paging need to be optimized accordingly.

There is a need, therefore, for mechanisms to shorten paging cycles for paging a group of target mobile stations.

SUMMARY

The disclosed embodiments provide novel and improved methods and apparatus for providing short-slot-cycle paging of mobile stations in a wireless communication network. In one aspect, a method in a communication device (CD) for providing short-slot-cycle paging includes receiving system parameter messages from a base station (BS), determining whether the BS is capable of short-slot-cycle paging, and indicating that the CD is also capable for short-slot-cycle paging, if the BS is determined to be capable of short-slot-cycle paging. The method further includes setting a negative slot-cycle-index value for the short-slot-cycle paging.

In one aspect, a method in a BS for providing short-slot-cycle paging includes indicating to a CD that the BS is capable of short-slot-cycle paging, receiving information from the CD, indicating that the CD is also capable for short-slot-cycle paging, and paging the CD based on the received information.

In one aspect, an apparatus for providing short-slot-cycle paging includes a memory unit, a receiver, a transmitter, and a processor communicatively coupled with the memory unit, the receiver, and the transmitter. The processor is capable of carrying out the above-mentioned methods.

BRIEF DESCRIPTION OF THE DRAWINGS

The features and advantages of the present invention will become more apparent from the detailed description of disclosed embodiments set forth below when taken in conjunction with the drawings, and wherein.

DETAILED DESCRIPTION

Figure 1:
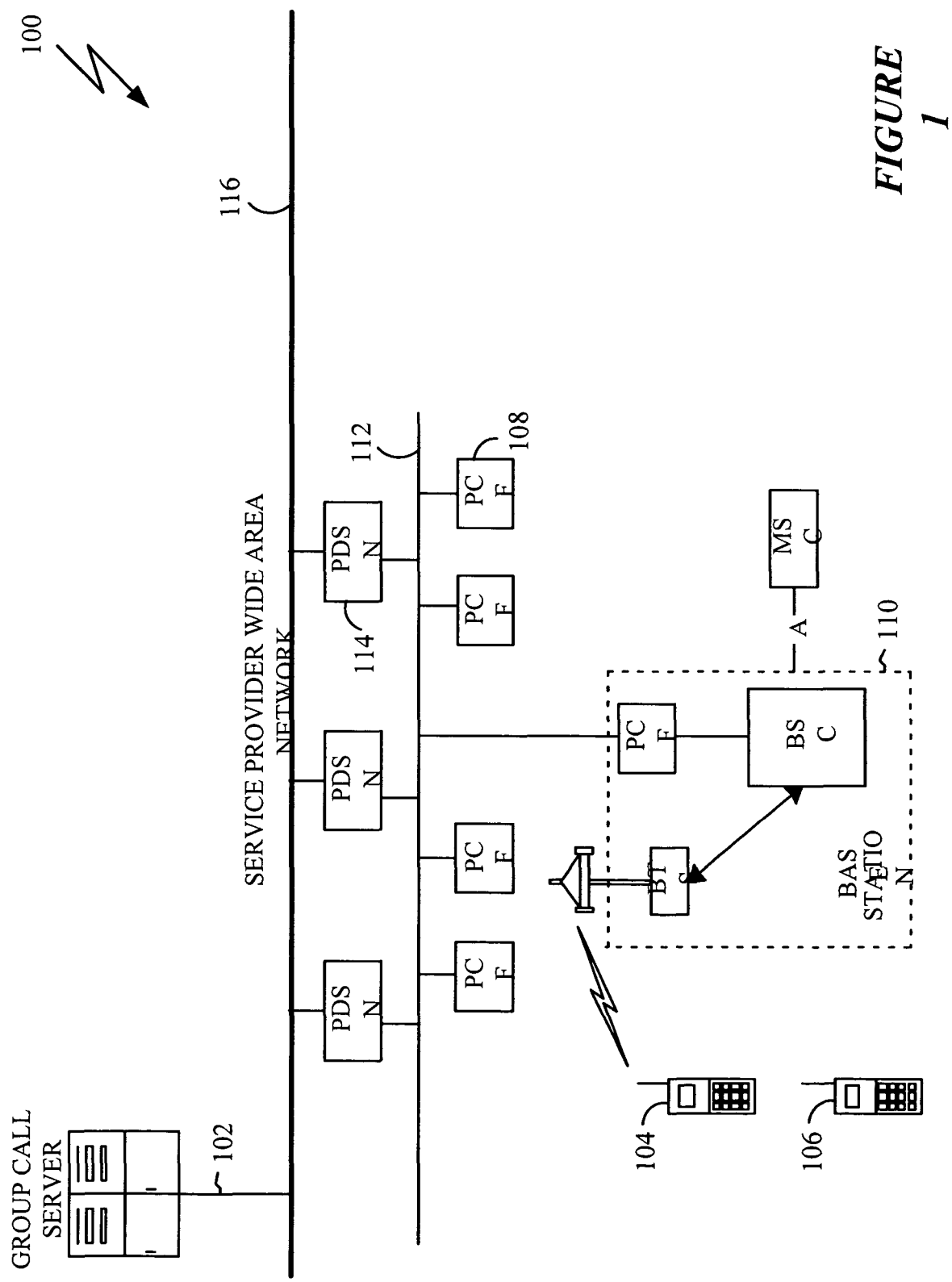
FIG. 1 illustrates a group communications system.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a functional block diagram of a group communication system 100, for implementing one embodiment. Group communication system 100 is also known as a push-to-talk (PTT) system, a net broadcast service (NBS), a dispatch system, or a point-to-multi-point communication system. In one embodiment, group communication system 100 includes a group call server 102, which may be deployed in either a centralized deployment or a regionalized deployment.

Group communication devices (CDs) 104 and 106, which may be deployed such as cdma 2000 handset, for example, may request packet data sessions using a data service option. Each CD may use the session to register its Internet Protocol (IP) address with the group call server to perform group call initiations. In one embodiment, group call server 102 is connected to the service provider's packet data service nodes (PDSNs) through a service provider's wide area network 116. CDs 104 and 106, upon requesting packet data sessions from the wireless infrastructure, may have IP connectivity to group call server 102 through a PDSN 114. The PDSNs provide interface between transmission of data in the fixed network and the transmission of data over the air interface. Each PDSN may interface to a base station controller (BSC) through a packet control function (PCF) 108 and a network 112. The PCF may be co-located with the BSC within a base station (BS) 110.

A packet data service node may fall in one of several states, e.g., active or connected state, dormant state, and null or inactive state. In the active or connected state, an active traffic channel exists between the participating CD and the BS or BSC, and either side may send data. In the dormant state, no active traffic channel exists between the participating CD and the BSC, but a point-to-point (PPP) link is maintained between the participating CD and the PDSN. In the null or inactive state, there is no active traffic channel between the participating CD and the BSC, and no PPP link is maintained between the participating CD and the PDSN.

After powering up, CDs 104 and 106 may request packet data sessions. As part of establishing a packet data session, each CD may be assigned an IP address. Each CD may perform a registration process to notify group call server 102 of the CD's IP address. Registration may be performed using an IP protocol, such as session initiation protocol (SIP) over user datagram protocol (UDP). The IP address of a CD may be used to contact the CD when the corresponding user is invited into a group call.

Once a group call is established, CDs 104 and 106 and group call server 102 may exchange media and signaling messages. In one embodiment, media may be exchanged between the participating CDs and the group call server by using real-time protocol (RTP) over UDP. The signaling messages may also be exchanged by using a signaling protocol over UDP.

Group communication system 100 performs several different functions in order to operate group call services. The functions that relate to the user side include user registration, group call initiation, group call termination, sending alerts to group participants, late join to a group call, talker arbitration, adding members to a group, removing members from a group, un-registering a member, and authentication. The functions that relate to system preparation and operation include administration and provisioning, scalability, and reliability.

Figure 2:
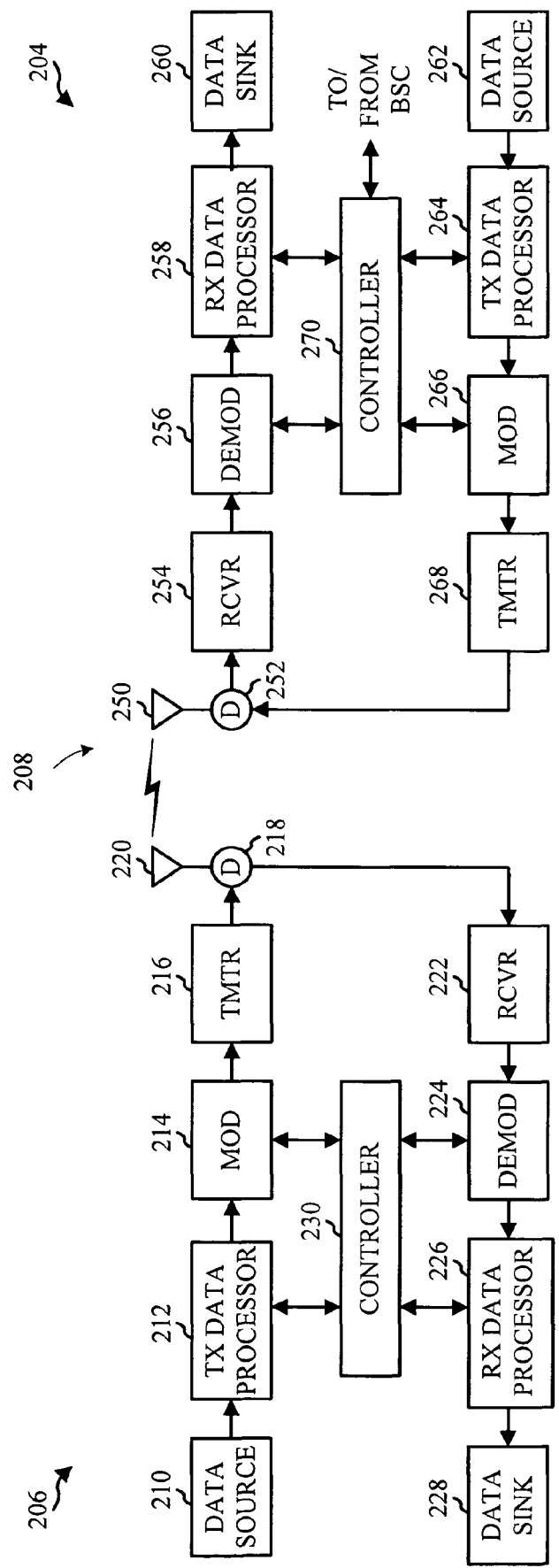
FIG. 2 illustrates an embodiment for a base station and a mobile station operating in FIG. 1.

FIG. 2 is a simplified block diagram of an embodiment of base station 204 and mobile station 206, which are capable of implementing various disclosed embodiments. For a particular communication, voice data, packet data, and/or messages may be exchanged between base station 204 and mobile station 206, via an air interface 208. Various types of messages may be transmitted, such as messages used to establish a communication session between the base station and mobile station, registration and paging messages, and messages used to control a data transmission (e.g., power control, data rate information, acknowledgment, and so on). Some of these message types are described in further detail below.

For the reverse link, at mobile station 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer 252, and provided to a receiver unit (RCVR) 254. Base station 204 may receive registration information and status information, e.g., mobile station mobility rate, from mobile station 206. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receiving (RX) data processor 258 then decodes the symbols to recover the data and messages transmitted on the reverse link. The recovered voice/packet data is provided to a data sink 260 and the recovered messages may be provided to a controller 270. Controller 270 may include instructions for paging a group of mobile stations, providing short-slot-cycle paging, indicating to a MS that the BS is capable of short-slot-cycle paging, receiving information from the CD, indicating that the CD is also capable for short-slot-cycle paging, and paging the CD based on the received information.

The processing by demodulator 256 and RX data processor 258 are complementary to that performed at mobile station 206. Demodulator 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple mobile stations, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to mobile station 206. Forward link signals include paging signals.

At mobile station 206, the forward link signal is received by antenna 220, routed through duplexer 218, and provided to a receiver unit 222. Receiver unit 222 conditions (e.g., down converts, filters, amplifies, quadrature modulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230. Controller 230 may include instructions for registering mobile station 206, providing short-slot-cycle paging information to a base station (BS), receiving system parameter messages from the BS, determining whether the BS is capable of short-slot-cycle paging, indicating that the CD is also capable for short-slot-cycle paging if the BS is determined to be capable of short-slot-cycle paging, and setting or encoding a desired slot cycle duration.

The group call service (GCS) may allow one user to talk to a group of users in a half-duplex or full-duplex mode. In the former case, because only one person may be permitted to talk at a time, the permission to talk may be moderated by the infrastructure. In such systems, a user may request permission to talk by pressing a "push-to-talk" button (PTT), for example. The system may arbitrate the requests received from multiple users and, through a contention-resolution process, the system may choose one of the requestors according to a predetermined algorithm. The system may then notify the chosen user that the user has permission to talk. The system may transparently dispatch the user's traffic information, such as voice and/or data, from the authorized talker to the rest of the group members, who may be considered "listeners." The voice and/or data traffic in GCS may be different from the classical one-to-one phone call, and a priority may be placed on some conversations.

Figure 3:
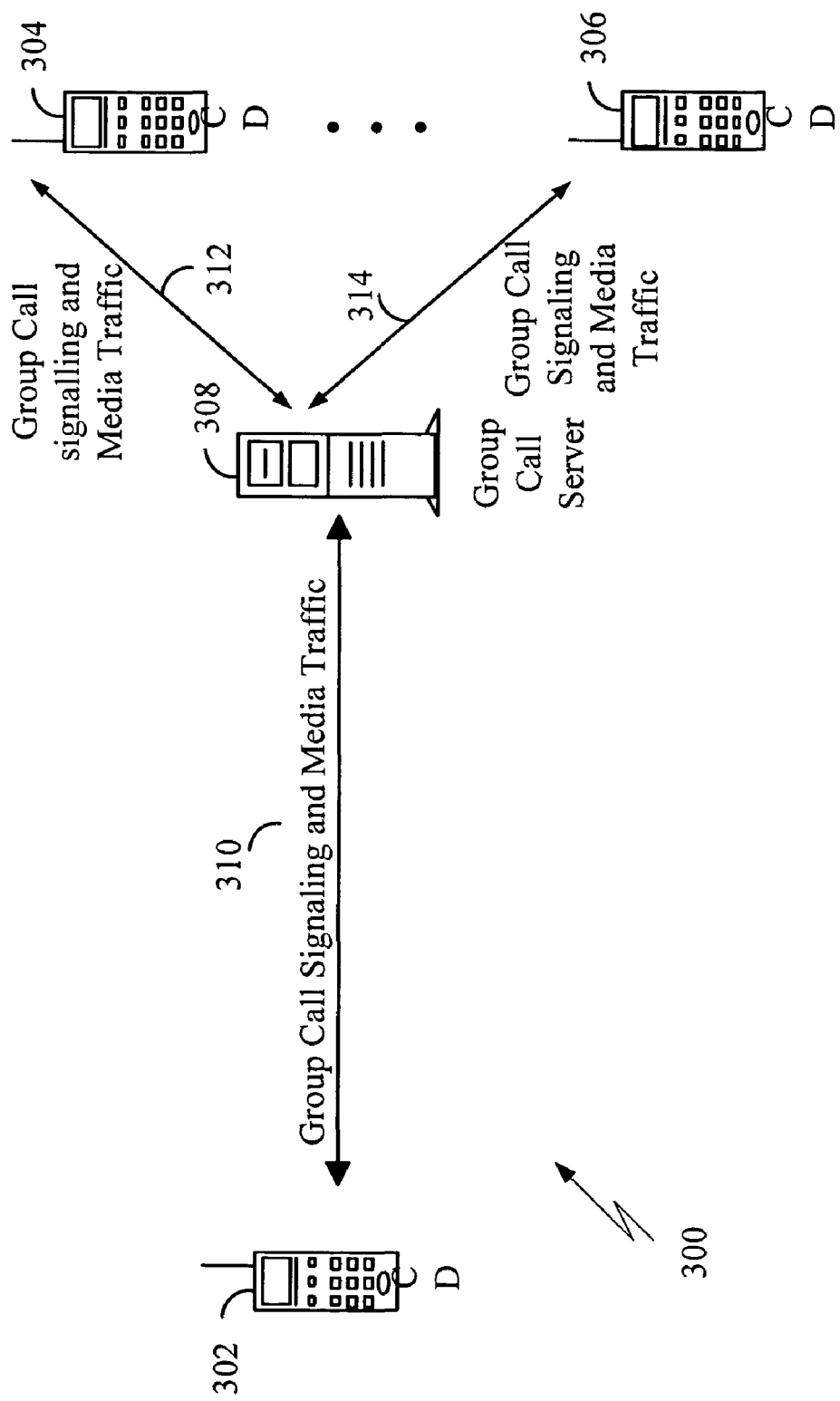
FIG. 3 illustrates how several communication devices interact with a group call server.

FIG. 3 illustrates a group call arrangement 300 for showing how CDs 302, 304, and 306 interact with a group call server 308. Multiple group call servers may be deployed as desired for large-scale groups. In FIG. 3, when CD 302 has permission to transmit media to other members of the group, CD 302 is known as the talker and may transmit media over an established channel. When CD 302 is designated as the talker, the remaining participants, CD 304 and CD 306, may not have permission to transmit media to the group. Accordingly, CD 304 and CD 306 are designated as listeners. As described above, CDs 302, 304, and 306 are connected to group call server 308, using at least one channel. In one embodiment, the channel may include a session initiation protocol (SIP) channel, a media-signaling channel, and a media traffic channel.

Figure 4:
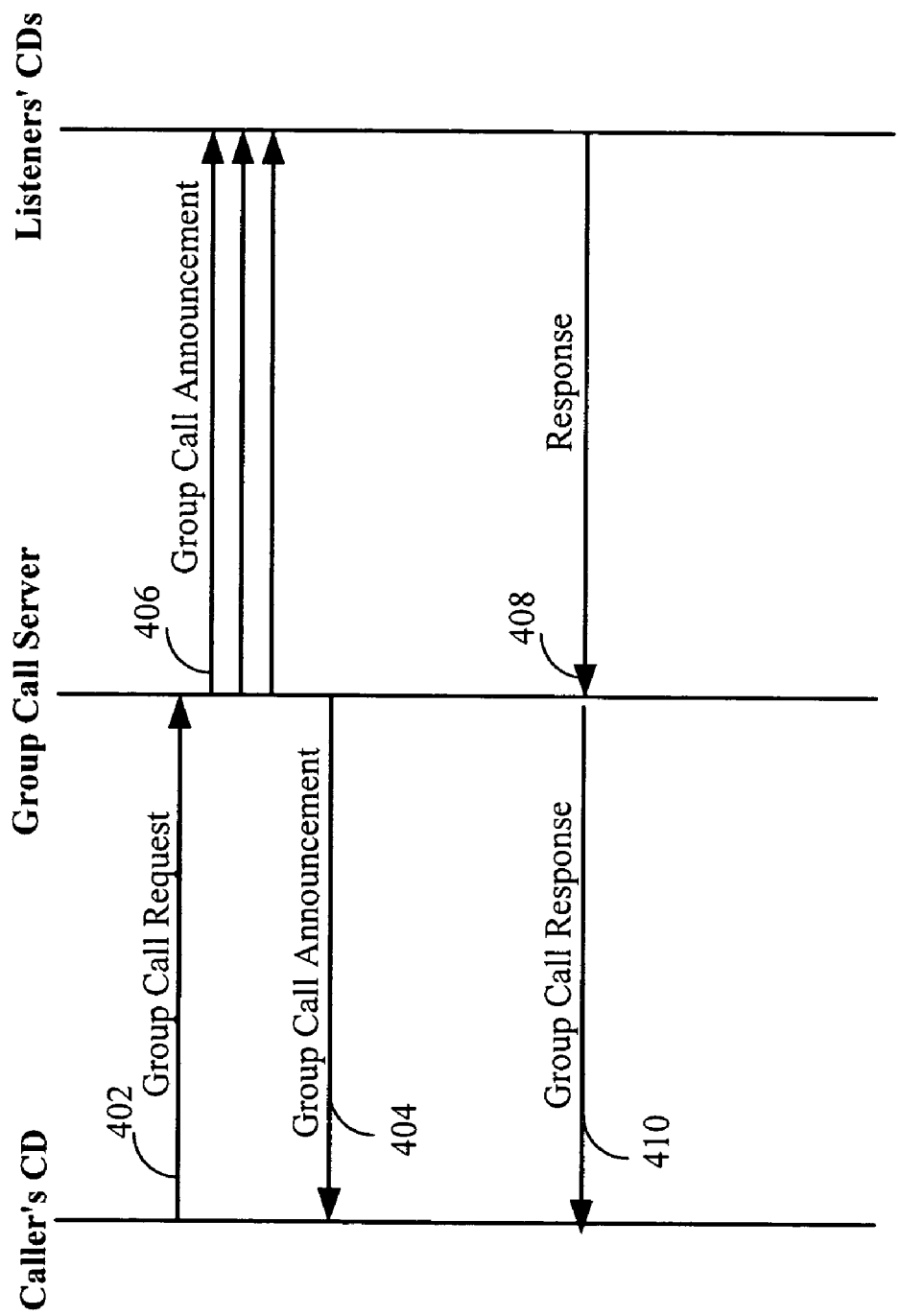
FIG. 4 illustrates a call-setup process according to one embodiment.

FIG. 4 illustrates a message-flow diagram showing a group call setup, according to one embodiment. A user who wishes to initiate a group call may select one or more target users, one or more pre-defined groups, or a combination of the two and may depress the push-to-talk (PTT) button on a CD, for example. The caller's CD may then send a group call request 402 to the group call server to setup the group call. The caller's CD may be in a dormant packet data session when the caller initiates the group call. The group call request may be transmitted regardless of whether the caller's CD has a dedicated traffic channel or not. After the group call request is sent, if the caller's CD is in dormant packet data session, the caller's CD may initiate the process of re-establishing its dedicated traffic channel and prepare the packet data session for media activity.

When the group call server receives the group call request, the group call server may expand the pre-defined groups, if any is specified in the received group call request, into a list of group members. The group call server may retrieve location information for the desired target group members. The group call server may also determine if the target group is already running in the system. FIG. 4 shows a scenario in which the group is not already running.

After the group call server locates at least one of the target group members, the group call server may send a response 404 back to the caller's CD indicating that the group call is being set up. At this point, the caller's CD may optimistically grant the caller's request to talk. The caller's CD may start buffering the received media for future transmission to the group call server. The group call server may use the location information of the target listeners' CDs to send out announcements 406 to the target listeners' CDs. Sending the announcements may trigger the packet data sessions of the target listeners' CDs to come out of dormancy and to re-establish their traffic channels.

After at least one of the target listener's has responded to the group call announcements 406, the group call server receives the response 408, and delivers a group call response 410 to the caller's CD.

In one embodiment, the group communication system supports both chat-room and ad-hoc models for group call services. In the chat-room model, groups are predefined, which may be stored on the group call server. The predefined groups, or nets, may be public, implying that the group has an open member list. In this case, each group member is a potential participant in a group call. The group call is started when a first group member starts to initiate a group call. The call remains running for a pre-determined time period, which may be configured by the service provider. During a group call, the group members may specifically request to join or leave the call. During periods of talk inactivity, the group call may be brought into a group dormant state until a group member requests permission to talk. When operating in the chat-room model, group members, also known as net members, communicate with one another using a communication device assigned to each net member. The term "net" denotes a group of members authorized to communicate with each other.

In the ad-hoc model of group call services, however, groups may be defined in real-time and have a closed member list associated with each group. A closed member list may specify which members are allowed to participate in the group call. The member list may not be available to others outside of the closed member list, and may only exist for the life of the call. Ad-hoc group definitions may not be stored in the group call server. The definitions may be used to establish the group call and released after the call has ended. An ad-hoc group may be formed when a caller selects one or more target members and generates a group call request, which is sent to the group call server to start the call. The group call server may send a notification to the target group members that they have been included in the group. The group call server may automatically join the target members into the group call, i.e., no action may be required from the target members. When an ad-hoc call becomes inactive, the group communication server may "tear down" the call and free the resources assigned to the group, including the group definition used to start the call.

The "instant response" relates to the call set up response time that starts with sending the group call request 402 from the caller's CD and ends with receiving the group call response 410 by the caller's CD. The goal for responding to the PTT or group call request is to consistently respond to the request within a predetermined time period, e.g., one and half seconds or less. In many cases, when a caller requests to setup a group call, the caller's packet data session is dormant, meaning that no dedicated traffic channel exists. Re-establishing active channels may take considerable time. In one embodiment, group call server pages the target listeners' CDs to locate the CDs.

Figure 5:
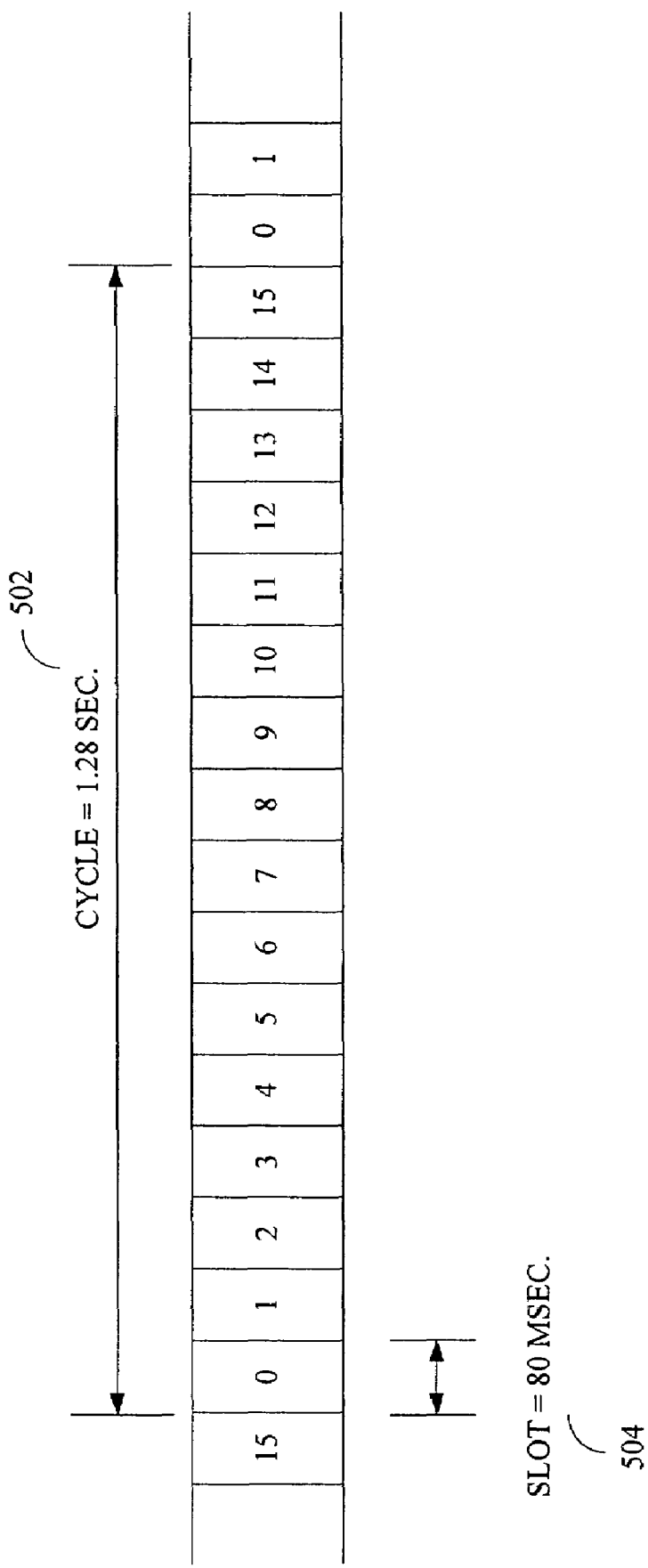
FIG. 5 illustrates one embodiment for slot cycle arrangement.

FIG. 5 shows one embodiment for a slot cycle arrangement. For example, a slot cycle 502 of 1.28 seconds consists of 16 slots 504 of 0.08 seconds each. A dormant target CD monitors a predetermined one of such slots on forward paging channel (F-PCH) or forward common control channel (F-CCCH) of the wireless infrastructures serving the target CD. Base stations and mobile stations may advertise their slot cycles by designating a value for SLOT_CYCLE_INDEX (SCI), for example. The slot cycle duration, also known as paging delay, may be defined by $2^{SCI}*1.28$ seconds. In one embodiment, SCI takes positive values, such as 0, 1, 2, 3, 4, etc. However, for positive SCI values, longer paging delays cause call set ups to take longer time. As discussed above, for some applications, such as group call services, shorter call set ups are required. In one embodiment, SCI takes negative values, such as −1, −2, −3, and −4. Negative SCI values shorten paging delays and hence call set up delays.

Figure 6:
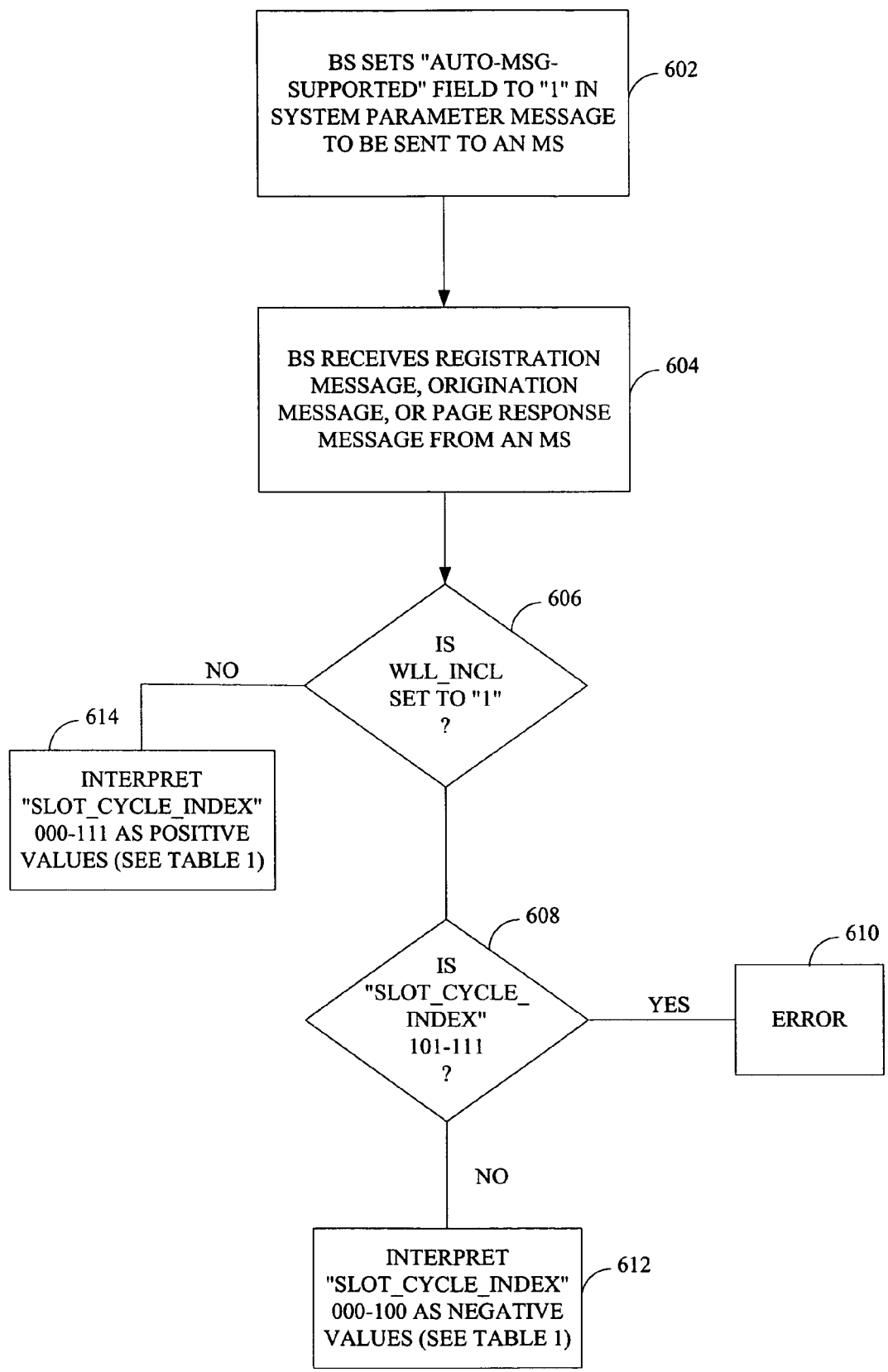
FIG. 6 illustrates a flow diagram for providing short-slot-cycle paging in a base station.
Figure 7:
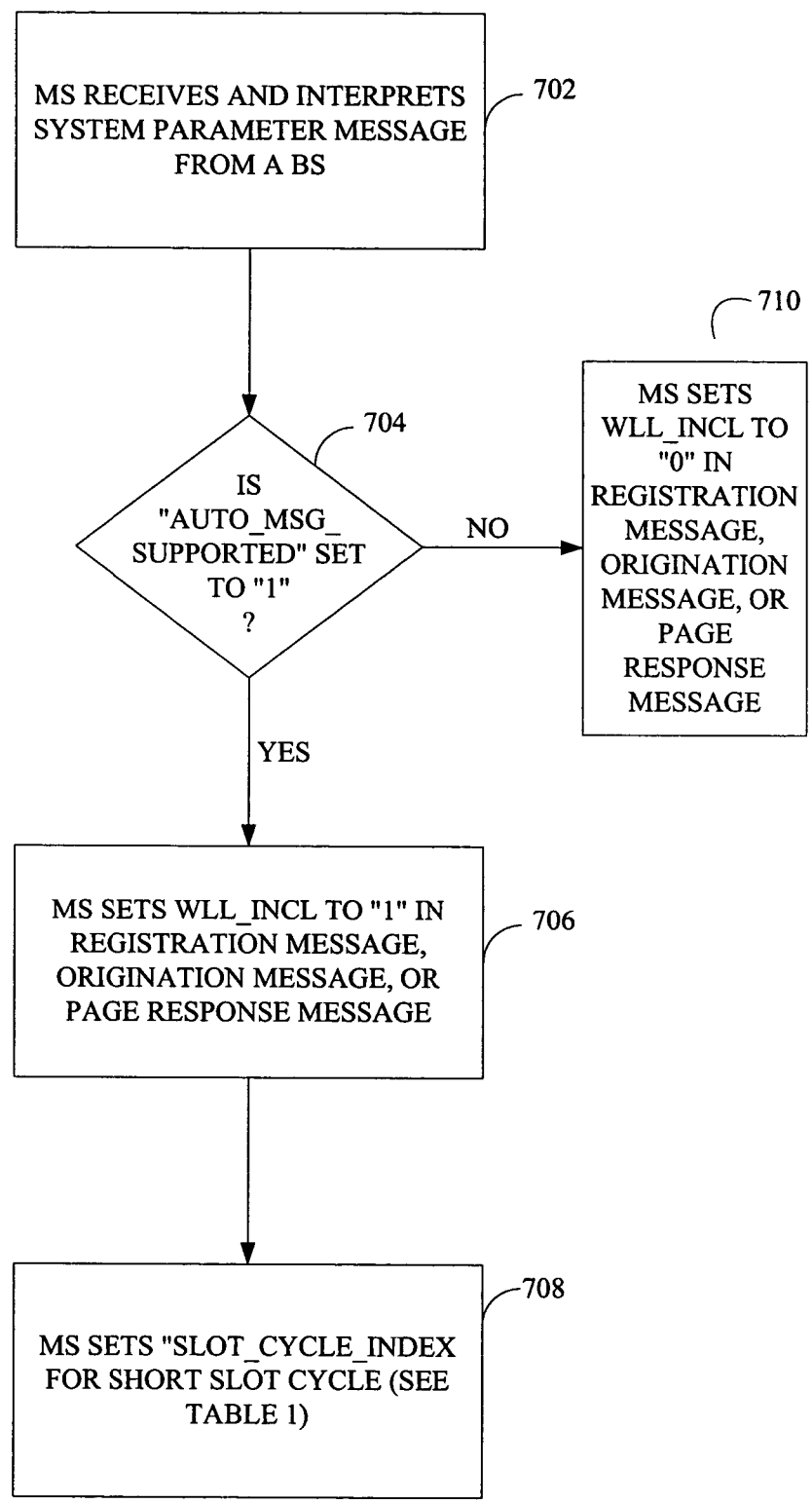
FIG. 7 illustrates a flow diagram for providing short-slot-cycle paging in a mobile station.

FIG. 6 illustrates a flow diagram for providing short-slot-cycle paging in a base station. BS may advertise its capability of negative slot-cycle-index paging to the target CDs. For example, the BS may set, in step 602, the AUTO_MSG_SUPPORTED field to "1" in the extended system parameter message (ESPM) or ANSI-41 system parameter message (A41SPM), to indicate whether BS supports negative slot-cycle-index paging. In step 604, the BS that supports negative slot-cycle-index paging receives and interprets the WLL_INCL field in the registration message (RM), origination message (OM), and page response message (PRM), form each of the target CDs. In step 606, if the WLL_INCL field is set to "1" in the received registration message, origination message, or page response message, indicating that the CD that sent one of these messages is also capable of negative slot-cycle-index paging, the BS interprets the slot-cycle-index value as being negative, as shown in Table 1.

In step 608, the BS examines whether the received slot cycle index, which may be in binary-number form, has a decimal value of 5, 6, or 7. If the received slot cycle index has a decimal value of 5, 6, or 7, an error message is generated in step 610, meaning that paging cycle may not be shorter than a single slot, e.g., 0.080 seconds. Otherwise, if the received slot cycle index has a decimal value of 0, 1, 2, 3, or 4, the BS interprets the received slot-cycle-index value as being negative, in step 612. A slot-cycle-index value of −1 causes the BS to page the target CD every eight slots, or every 0.64 seconds. A slot cycle index value of −2 causes the BS to page the target CD every four slots, or every 0.32 seconds. A slot cycle index value of −3 causes the BS to page the target CD every two slots, or every 0.16 seconds. A slot cycle index value of −4 causes the BS to page the target CD every slot, or every 0.08 seconds, providing a relatively shorter slot cycle paging.

However, if in step 606 the WLL_INCL field is set to "0" in the registration message, origination message, or page response message, indicating that the CD that sent one of these messages is not capable of negative-slot-index paging, the BS interprets, in step 614, the slot cycle index value as being positive, as shown in Table 1. A slot-cycle-index value of "0" causes the BS to page the target CD every 16 slots, or every 1.28 seconds. A slot-cycle-index value of 1 causes the BS to page the target CD every 32 slots, or every 2.56 seconds. A slot-cycle-index value of 2 causes the BS to page the target CD every 64 slots, or every 5.12 seconds. A slot cycle-index-value of 3 causes the BS to page the target CD every 128 slots, or every 10.24 seconds. Similarly, a slot-cycle-index value of 7 causes the BS to page the target CD every 2048 slot, or every 163.84 seconds, providing a relatively longer slot cycle paging.

However, if in step 606 the WLL_INCL field is set to "0" in the registration message, origination message, or page response message, indicating that the CD that sent one of these messages is not capable of negative-slot-index paging, the BS interprets, in step 614, the slot cycle index value as being positive, as shown in Table 1. A slot-cycle-index value of "0" causes the BS to page the target CD every 16 slots, or every 1.28 seconds. A slot-cycle-index value of 1 causes the BS to page the target CD every 32 slots, or every 2.56 seconds. A slot-cycle-index value of 2 causes the BS to page the target CD every 64 slots, or every 5.12 seconds. A slot cycle-index value of 3 causes the BS to page the target CD every 128 slots, or every 10.24 seconds. Similarly, a slot-cycle-index value of 7 causes the BS to page the target CD every 2048 slot, or every 163.84 seconds, providing a relatively longer slot cycle paging.

TABLE 1

| SLOT CYCLE_INDEX | WLL_INCL | Slot Cycle Length |
|---|---|---|
| 111 | 1 | Failure condition |
| 100 | 1 | Failure condition |
| 101 | 1 | Failure condition |
| 110 | 1 | 0.08 s (1 slot) |
| 011 | 1 | 0.16 s (2 slots) |
| 010 | 1 | 0.32 s (4 slots) |
| 001 | 1 | 0.64 s (8 slots) |
| 000 | 1 or 0 | 1.28 s (16 slots) |
| 001 | 0 | 2.56 s (32 slots) |
| 010 | 0 | 5.12 s (64 slots) |
| 011 | 0 | 10.24 s (128 slots) |
| 100 | 0 | 20.48 s (256 slots) |
| 101 | 0 | 40.96 s (512 slots) |
| 110 | 0 | 81.92 s (1024 slots) |
| 111 | 0 | 163.84 s (2048 slots) |

In step 704, if the CD determines that the BS has set the AUTO_MSG_SUPPORTED field to "0," indicating that the BS is not capable of short-slot-cycle paging, the CD sets, in step 710, the WLL_INCL field to "0" in the registration message, origination message, or page response message. As discussed above, these messages indicate to the BS that the target CD is not capable of short-slot-cycle paging, and the associated slot cycle index may be considered being positive, as discussed above and shown in Table 1.

Figure 8:
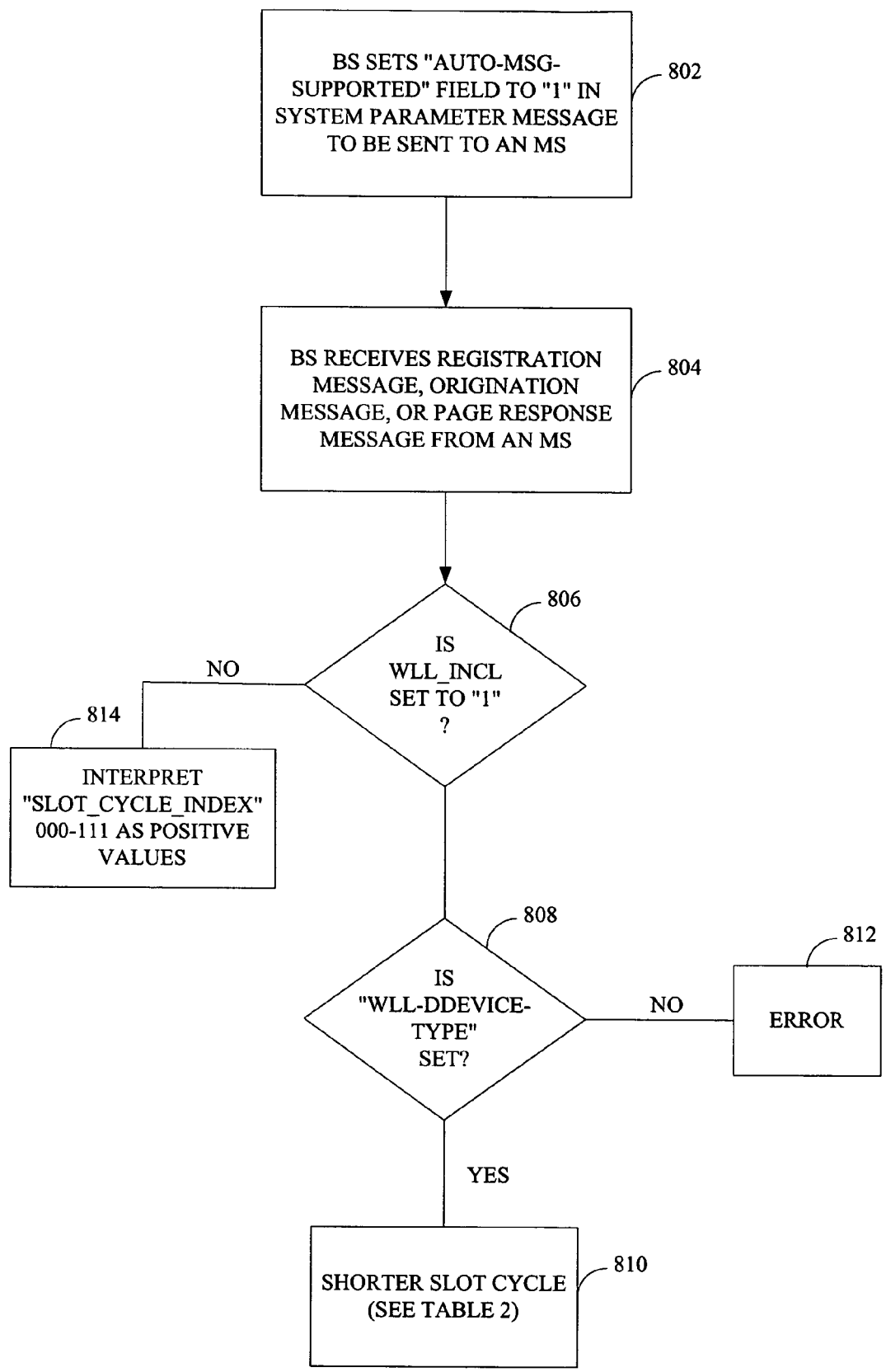
FIG. 8 illustrates a flow diagram for providing short-slot-cycle paging in a base station.

FIG. 8 illustrates a flow diagram for providing short-slot-cycle paging in a base station, in one embodiment. The BS may advertise its capability of negative slot-cycle-index paging to the target CDs. For example, the BS may set, in step 802, the AUTO_MSG_SUPPORTED field to "1" in the extended system parameter message (ESPM) or ANSI-41 system parameter message (A41SPM), to indicate whether BS supports negative slot-cycle-index paging. In step 804, the BS that supports negative slot-cycle-index paging receives and interprets the WLL_INCL field in the registration message (RM), origination message (OM), and page response message (PRM), form each of the target CDs. In step 806, if the WLL_INCL field is set to "1" in the received registration message, origination message, or page response message, indicating that the CD that sent one of these messages is also capable of negative slot-cycle-index paging, the BS interprets the slot-cycle-index value as being negative, as shown in Table 1.

In step 808, the BS examines whether the CD that supports short slot cycle has set a value for shorter slot cycle paging. In one embodiment, the CD may set such value in a WLL-DEVICE_TYPE filed, as shown in Table 2. The BS may store the specified short slot cycle duration in a database and page the target CD that is capable of short slot cycle paging based on the stored value.

TABLE 2

| WLL_DEVICE_TYPE (binary) | Shorter Slot Cycle Representation | Slot Cycle Length |
|---|---|---|
| 001 | −1 | 0.64 s (8 slots) |
| 010 | −2 | 0.32 s (4 slots) |

TABLE 2-continued

| WLL_DEVICE_TYPE (binary) | Shorter Slot Cycle Representation | Slot Cycle Length |
|---|---|---|
| 011 | −3 | 0.16 s (2 slots) |
| 100 | −4 | 0.08 s (1 slot) |

If the content of the WLL-DEVICE_TYPE field is set to a decimal value of 1, 2, 3, or 4, the BS interprets the received value as a negative slot-cycle-index, in step 810. A slot-cycle-index value of −1 causes the BS to page the target CD every eight slots, or every 0.64 seconds. A slot cycle index value of −2 causes the BS to page the target CD every four slots, or every 0.32 seconds. A slot cycle index value of −3 causes the BS to page the target CD every two slots, or every 0.16 seconds. A slot cycle index value of −4 causes the BS to page the target CD every slot, or every 0.08 seconds, providing a relatively shorter slot cycle paging.

However, if in step 806, the WLL_INCL field is set to "0" in the registration message, origination message, or page response message, indicating that the CD that sent one of these messages is not capable of negative-slot-index paging, the BS interprets, in step 814, the slot cycle index value as being positive, as discussed above.

Figure 9:
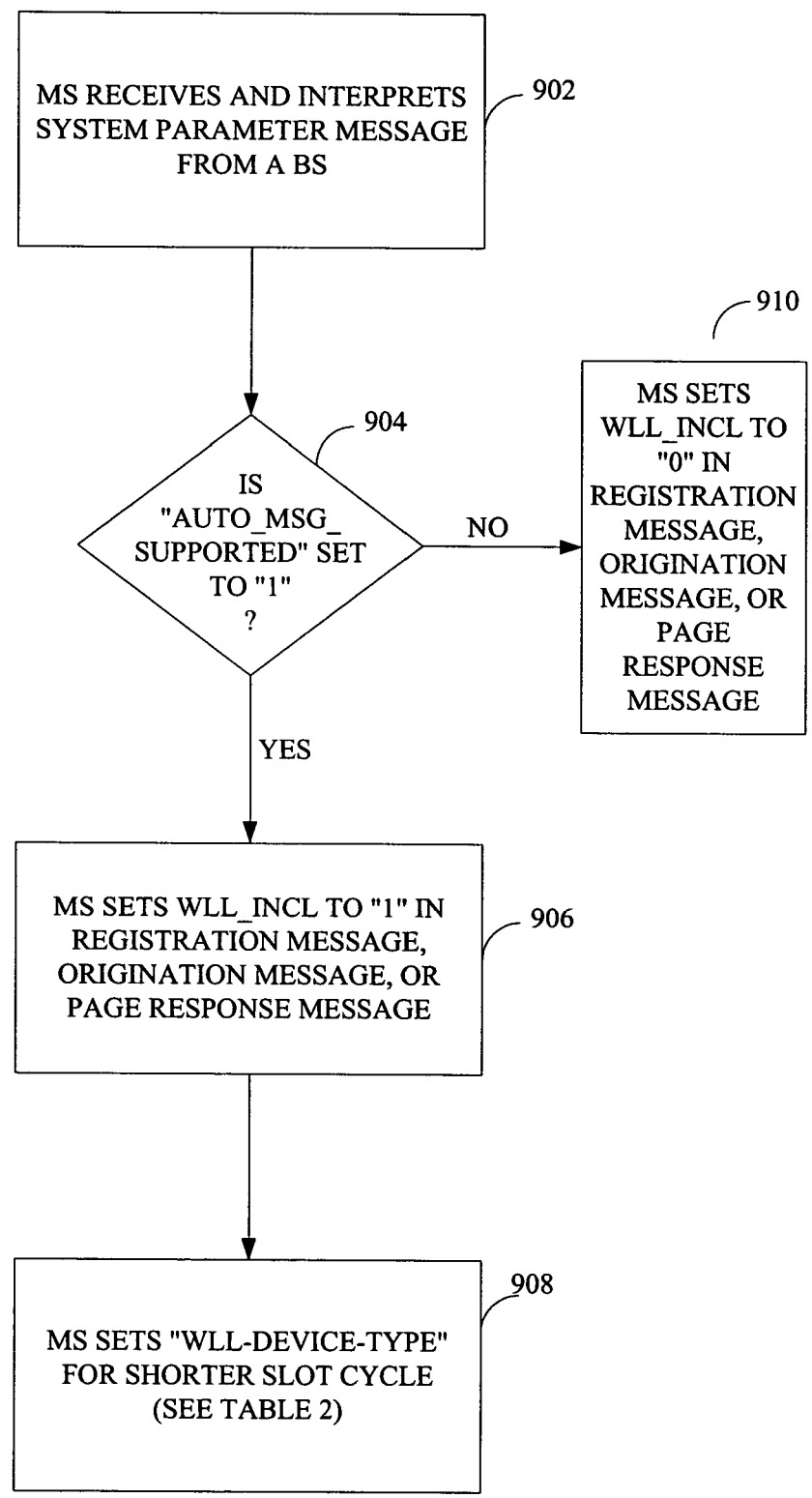
FIG. 9 illustrates a flow diagram for providing short-slot-cycle paging in a mobile station.

FIG. 9 illustrates a flow diagram for providing short-slot-cycle paging in a target CD, according to one embodiment. Each target CD may advertise its capability of negative or shorter slot cycle paging to the BS. For example, in step 902, a CD receives and interprets the field AUTO_MSG_SUPPORTED in the extended system parameter message (ESPM) or ANSI-41 system parameter message (A41SPM), to determine whether the BS is capable of short-slot-cycle paging. In step 904, if the CD determines that the BS has set the AUTO_MSG_SUPPORTED field to "1," indicating that the BS is capable of short-slot-cycle paging, the CD that is also capable of short-slot-cycle paging sets, in step 906, the WLL_INCL field to "1" in the registration message, origination message, or page response message. As discussed above, these messages indicate to the BS that the target CD is capable of short-slot-cycle paging, and the associated slot cycle index be considered negative, as discussed above and shown in Table 2. In step 908, the CD may set a desired slot cycle duration by specifying or encoding the WWL-DEVICE-TYPE filed.

In step 904, if the CD determines that the BS has set the AUTO_MSG_SUPPORTED field to "0," indicating that the BS is not capable of short-slot-cycle paging, the CD sets, in step 910, the WLL_INCL field to "0" in the registration message, origination message, or page response message. As discussed above, these messages indicate to the BS that the target CD is not capable of short-slot-cycle paging, and the associated slot cycle index be considered positive, as discussed above.

Figure 10:
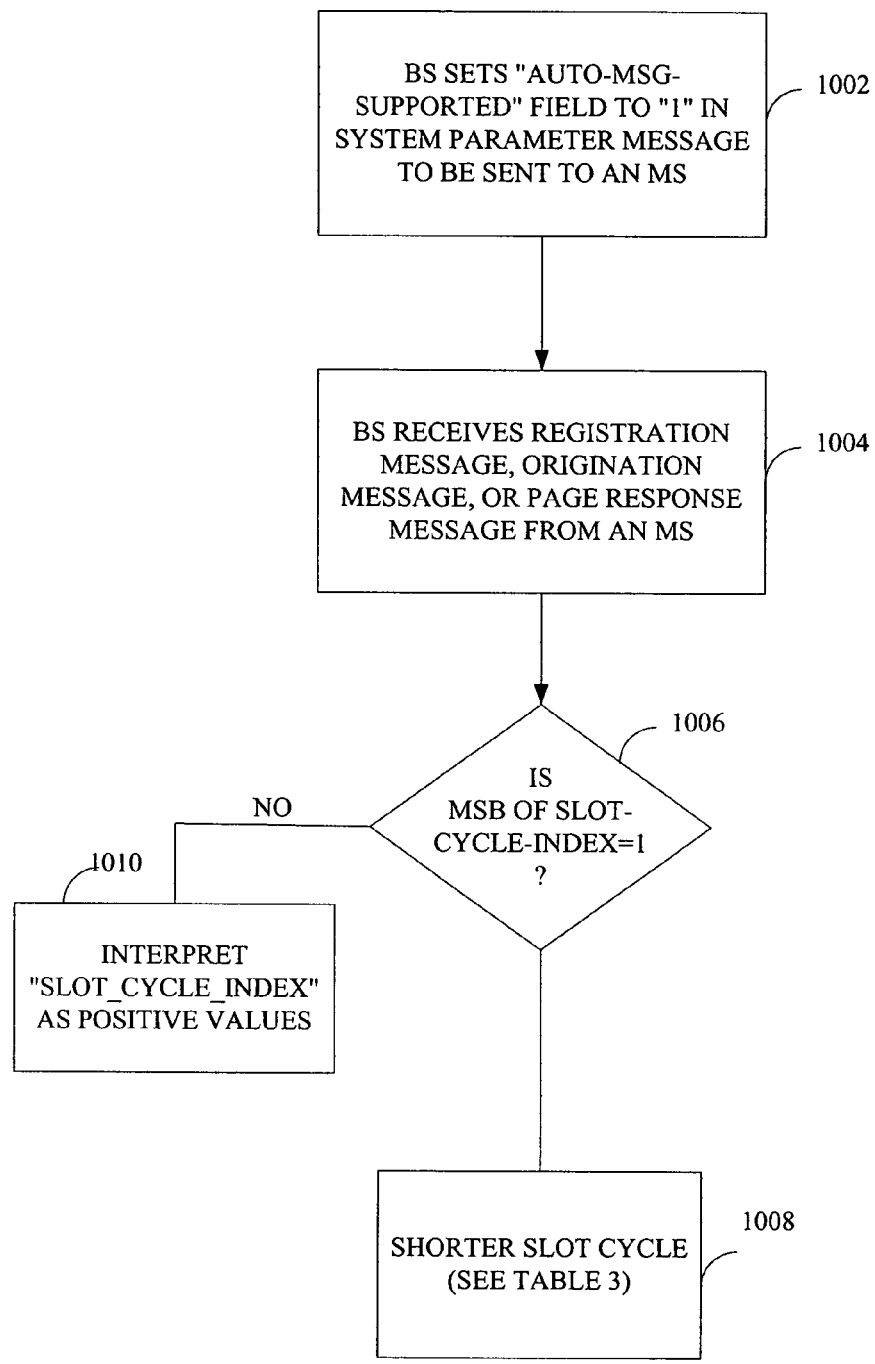
FIG. 10 illustrates a flow diagram for providing short-slot-cycle paging in a base station.

FIG. 10 illustrates a flow diagram for providing short-slot-cycle paging in a base station. BS may advertise its capability of negative slot-cycle-index paging to the target CDs. For example, the BS may set, in step 1002, the AUTO_MSG_SUPPORTED field to "1" in the extended system parameter message (ESPM) or ANSI-41 system parameter message (A41SPM), to indicate whether BS supports negative slot-cycle-index paging. In step 1004, the BS that supports negative slot-cycle-index paging receives and interprets the slot-cycle-index field in the registration message (RM), origination message (OM), and page response message (PRM), form each of the target CDs. In step 1006, if the most significant bit (MSB) of the slot-cycle-index field is set to "1," indicating that the CD that sent one of these messages is also capable of negative slot-cycle-index paging, the BS interprets the slot-cycle-index value as being negative, as shown in Table 3.

TABLE 3

| SLOT_CYCLE_INDEX (binary) | Old Definition (in CDMA2000 standard) | New Definition |
|---|---|---|
| 100 | 20.48 s (256 slots) | 0.08 s (1 slot) |
| 101 | 40.96 s (512 slots) | 0.16 s (2 slots) |
| 110 | 81.92 s (1024 slots) | 0.32 s (4 slots) |
| 111 | 163.84 s (2048 slots) | 0.64 s (8 slots) |

If the content of the slot-cycle-index field is set to a decimal value of 4, 5, 6, or 7, the BS interprets the received value as a negative slot-cycle-index, in step 1008. A slot-cycle-index value of 4 causes the BS to page the target CD every slot, or every 0.08 seconds, providing a relatively shorter slot cycle paging. A slot cycle index value of 5 causes the BS to page the target CD every two slots, or every 0.16 seconds. A slot cycle index value of 6 causes the BS to page the target CD every four slots, or every 0.32 seconds. A slot cycle index value of 7 causes the BS to page the target CD eight slot, or every 0.64 seconds. However, if in step 1006, the MSB of the slot-cycle-index is determined to be "0," indicating that the CD that sent one of these messages is not capable of negative-slot-index paging, the BS interprets the slot cycle index value as being positive, as shown in Table 1.

Figure 11:
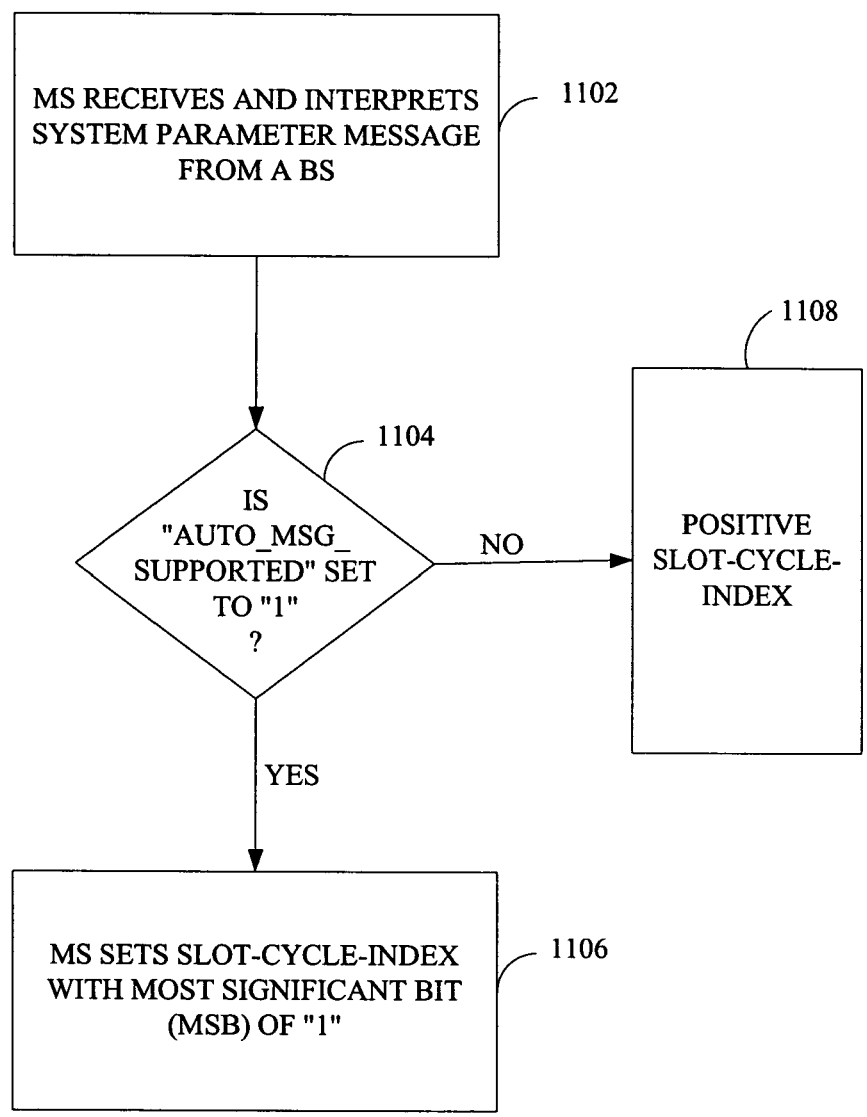
FIG. 11 illustrates a flow diagram for providing short-slot-cycle paging in a mobile station.

FIG. 11 illustrates a flow diagram for providing short-slot-cycle paging in a target CD, in one embodiment. Each target CD may advertise its capability of negative or shorter slot cycle paging to the BS. For example, in step 1102, a CD receives and interprets the field AUTO_MSG_SUPPORTED in the extended system parameter message (ESPM) or ANSI-41 system parameter message (A41SPM), to determine whether the BS is capable of short-slot-cycle paging. In step 1104, if the CD determines that the BS has set the AUTO_MSG_SUPPORTED field to "1," indicating that the BS is capable of short-slot-cycle paging, the CD that is also capable of short-slot-cycle paging sets or codes, in step 1106, the desired short slot cycle duration by specifying or encoding a slot-cycle-index with the MSB of "1" in the registration message, origination message, or page response message. As discussed above, these messages indicate to the BS that the target CD is capable of short-slot-cycle paging, and the associated slot cycle index may be considered negative, as discussed above and shown in Table 3.

In step 1104, if the CD determines that the BS has set the AUTO_MSG_SUPPORTED field to "0," indicating that the BS is not capable of short-slot-cycle paging, the CD interprets, in step 1108, the slot-cycle-index with MSB of "0" as being positive, as discussed above and shown in Table 1

Therefore, the disclosed embodiments provide for a significant reduction in paging delays when paging a group of target mobile stations in a group communication system. The disclosed methods and apparatus also provide for faster call set ups by optimizing the registration and paging of the mobile stations.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration."

The invention claimed is:

1. A method in a communication device (CD) for providing short-slot-cycle paging information to a base station (BS), wherein the short-slot-cycle paging comprises paging at an interval less than a slot-cycle, the method comprising:
   determining whether the BS is capable or short-slot-cycle paging; and
   indicating that the CD is also capable for short-slot-cycle paging if the BS is determined to be capable of show-slot-cycle paging.

2. The method of claim 1, further including setting a negative SLOT_CYCLE_INDEX value for said short-slot-cycle paging.

3. The method of claim 2, wherein the negative SLOT_CYCLE_INDEX value includes one of "–1," "–2," "–3," or "–4."

4. The method of claim 1, wherein said determining includes examining system parameter messages including extended system parameter messages (ESPM).

5. The method of claim 1, wherein said determining includes examining system parameter messages including ANSI-41 system parameter messages (A41 SPM).

6. The method of claim 1, wherein said determining includes examining whether AUTO_MSG_SUPPORTED field is set to "1."

7. The method of claim 1, wherein said indicating includes setting WLL_INCL to "1" in one of registration message, origination message, or page response message.

8. The method of claim 7, further including setting a desired slot cycle duration in a SLOT_CYCLE_INDEX field.

9. The method of claim 7, further including setting a desired slot cycle duration in a WLL_DEVICE_TYPE field.

10. The method of claim 1, wherein said indicating includes setting a SLOT_CYCLE_INDEX with a most significant bit of "1" in one of registration message, origination message, or page response message.

11. A method in a base station (BS) for providing short-slot-cycle paging, wherein the short-slot-cycle paging comprises paging at an intervalless than a slot-cycle, the method comprising:
   indicating to a communication device (CD) that the BS is capable of short-slot-cycle paging;
   receiving information from the CD, indicating that the CD is also capable for short-slot-cycle paging; and
   paging the CD based on the received information.

12. The method of claim 11, wherein said paging includes paging the CD based on a negative SLOT_CYCLE_INDEX value.

13. The method of claim 11, wherein said indicating includes setting AUTO_MSG_SUPPORTED field to "1" in extended system parameter messages (ESPM).

14. The method of claim 11, wherein said indicating includes setting AUTO_MSG_SUPPORTED field to "1" in ANSI-41 system parameter messages (A41SPM).

15. The method of claim 11, wherein the information includes WLL_INCL field set "1" in one of registration message, origination message, or page response message.

16. The method of claim 15, wherein the information further includes a desired slot cycle duration in a SLOT_CYCLE_INDEX field.

17. The method of claim 15, wherein the information further includes a desired slot cycle duration in a WLL_DEVICE_TYPE field.

18. The method of claim 11, wherein the information includes a SLOT_CYCLE_INDEX with a most significant bit of "1" in one of registration message, origination message, or page response message.

19. A computer-readable medium storing codes for enabling a processor to perform a method in a communication device (CD) for providing short-slot-cycle paging information to a base station (BS), wherein the short-slot-cycle paging comprises paging at an interval less than a slot-cycle, the method comprising:
- determining whether the BS is capable of short-slot-cycle paging; and
- indicating that the CD is also capable for short-slot-cycle paging if the BS is determined to be capable of short-slot-cycle paging.

20. The computer-readable medium of claim 19, the method further including setting a negative SLOT_CYCLE_INDEX value for said short-slot-cycle paging.

21. The computer-readable medium of claim 20, wherein the negative SLOT_CYCLE_INDEX value includes one of "−1," "−2," "−3," or "−4."

22. The computer-readable medium of claim 19, wherein said determining includes examining system parameter messages including extended system parameter messages (ESPM).

23. The computer-readable medium of claim 19, wherein said determining includes examining system parameter messages including ANSI-41 system parameter messages (A41SPM).

24. The computer-readable medium of claim 19, wherein said determining includes examining whether AUTO_MSG_SUPPORTED field is set to "1."

25. The computer-readable medium of claim 19, wherein said indicating includes setting WLL_INCL to "1" in one of registration message, origination message, or page response message.

26. The computer-readable medium of claim 25, the method further including setting a desired slot cycle duration in a SLOT_CYCLE_INDEX field.

27. The computer-readable medium of claim 25, the method further including setting a desired slot cycle duration in a WLL_DEVICE_TYPE field.

28. The computer-readable medium of claim 19, wherein said indicating includes setting a SLOT_CYCLE_INDEX with a most significant bit of "1" in one of registration message, origination message, or page response message.

29. A computer-readable medium storing codes for enabling a processor to perform a method in a base station (BS) for providing short-slot-cycle paging information to a communication device (CD), wherein the short-slot-cycle paging comprises paging at an interval less than a slot-cycle, the method comprising:
- indicating to a communication device (CD) that the BS is capable of short-slot-cycle paging;
- receiving information from the CD, indicating that the CD is also capable for short-slot-cycle paging; and
- paging the CD based on the received information.

30. The computer-readable medium of claim 29, wherein said paging includes paging the CD based on a negative SLOT_CYCLE_INDEX value.

31. The computer-readable medium of claim 29, wherein said indicating includes setting AUTO_MSG_SUPPORTED field to "1" in extended system parameter messages (ESPM).

32. The computer-readable medium of claim 29, wherein said indicating includes setting AUTO_MSG_SUPPORTED field to "1" in ANSI-41 system parameter message (A41SPM).

33. The computer-readable medium of claim 29, wherein the information includes WLL_INCL field set "1" in one of registration message, origination message, or page response message.

34. The computer-readable medium of claim 33, wherein the information further includes a desired slot cycle duration in a SLOT_CYCLE_INDEX field.

35. The computer-readable medium of claim 33, wherein the information further includes a desired slot cycle duration in a $WLL_{13}$ DEVICE_TYPE field.

36. The computer-readable medium of claim 29, wherein the information includes a SLOT_CYCLE_INDEX with a most significant bit of "1" in one of registration message, origination message, or page response message.

37. A communication device (CD) for providing short-slot-cycle paging information to a base station (BS), wherein the short-slot-cycle paging comprises paging at an interval less than a slot-cycle, comprising:
- means for determining whether the BS is capable of short-slot-cycle paging; and
- means for indicating that the CD is also capable for short-slot-cycle paging if the BS is determined to be capable of short-slot-cycle paging.

38. The CD of claim 37, further including means for setting a negative SLOT_CYCLE_INDEX value for said short-slot-cycle paging.

39. The CD of claim 37, wherein the negative SLOT_CYCLE_INDEX value includes one of "−1," "−2," "−3," or "−4."

40. The CD of claim 37, wherein said means for determining includes means for examining system parameter messages including extended system parameter messages (ESPM).

41. The CD of claim 37, wherein said means for determining includes means for examining system parameter messages including ANSI-41 system parameter messages (A41SPM).

42. The CD of claim 37, wherein said means for determining includes means for examining whether AUTO_MSG_SUPPORTED field is set to "1."

43. The CD of claim 37, wherein said means for indicating includes means for setting WLL_INCL to "1" in one of registration message, origination message, or page response message.

44. The CD of claim 43 further including means for setting a desired slot cycle duration in a SLOT_CYCLE_INDEX field.

45. The CD of claim 43, further including means for setting a desired slot cycle duration in a WLL_DEVICE_TYPE field.

46. The CD of claim 37, wherein said means for indicating includes means for setting a SLOT_CYCLE_INDEX with a most significant bit of "1" in one of registration message, origination message, or page response message.

47. A base station (BS) for providing short-slot-cycle paging, comprising:
- means for indicating to a communication device (CD) that the BS is capable of short-slot-cycle paging wherein the short-slot-cycle paging comprises paging at an interval less than a slot-cycle;
- means for receiving information from the CD, indicating that the CD is also capable for short-slot-cycle paging; and
- means for paging the CD based on the received information.

48. The BS of claim 47, wherein said means for paging includes means for paging the CD based on a negative SLOT_CYCLE_INDEX value.

49. The BS of claim 47, wherein said means for indicating includes means for setting AUTO_MSG_SUPPORTED field to "1" in extended system parameter messages (ESPM).

50. The BS of claim 47, wherein said means for indicating includes means for setting AUTO_MSG_SUPPORTED field to "1" in ANSI-41 system parameter messages (A41SPM).

51. The BS of claim 47, wherein the information includes WLL_INCL field set "1" in one of registration message, origination message, or page response message.

52. The BS of claim 51, wherein the information further includes a desired slot cycle duration in a SLOT_CYCLE_INDEX field.

53. The BS of claim 51, wherein the information further includes a desired slot cycle duration in a WLL_DEVICE_TYPE field.

54. The BS of claim 47, wherein the information includes a SLOT_CYCLE_INDEX with a most significant bit of "1" in one of registration message, origination message, or page response message.

55. A communication device (CD) for providing short-slot-cycle paging information to a base station (BS), wherein the short-slot-cycle paging comprises paging at an interval less than a slot-cycle, comprising:
a receiver capable of receiving information from a base station (BS);
a transmitter capable of transmitting information to the BS; and
a processor capable of carrying out a method for providing short-slot-cycle paging information to a base station (BS), the method comprising:
determining whether the BS is capable of short-slot-cycle paging; and
indicating that the CD is also capable for short-slot-cycle paging if the BS is determined to be capable of short-slot-cycle paging.

56. The CD of claim 55, the method further including setting a negative SLOT_CYCLE_INDEX value for said short-slot-cycle paging.

57. The CD of claim 55, wherein the negative SLOT_CYCLE_INDEX value includes one of "−1," "−2," "−3," or "−4."

58. The CD of claim 55, wherein said determining includes examining system parameter messages including extended system parameter messages (ESPM).

59. The CD of claim 55, wherein said determining includes examining system parameter messages including ANSI-41 system parameter messages (A41SPM).

60. The CD of claim 55, wherein said determining includes examining whether AUTO_MSG_SUPPORTED field is set to "1."

61. The CD of claim 55, wherein said indicating includes setting WLL_INCL to "1" in one of registration message, origination message, or page response message.

62. The CD of claim 61, the method further including setting a desired slot cycle duration in a SLOT_CYCLE_INDEX field.

63. The CD of claim 61, the method further including setting a desired slot cycle duration in a WLL_DEVICE_TYPE field.

64. The CD of claim 55, wherein said indicating includes setting a SLOT_CYCLE_INDEX with a most significant bit of "1" in one of registration message, origination message, or page response message.

65. A base station (BS) for providing short-slot-cycle paging, wherein the short-slot-cycle paging comprises paging at an interval less than a slot-cycle, comprising:
a receiver capable of receiving information from a communication device (CD);
a transmitter capable of transmitting information to the CD; and
a processor capable of carrying out a method for providing short-slot-cycle paging, the method comprising:
indicating to the CD that the BS is capable of short-slot-cycle paging;
receiving information from the CD, indicating that the CD is also capable for short-slot-cycle paging; and
paging the CD based on the received information.

66. The BS claim 65, wherein said paging includes paging the CD based on a negative SLOT_CYCLE_INDEX value.

67. The BS of claim 65, wherein said indicating includes setting AUTO_MSG_SUPPORTED field to "1" in extended system parameter messages (ESPM).

68. The BS of claim 65, wherein said indicating includes setting AUTO_MSG_SUPPORTED field to "1" in ANSI-41 system parameter messages (A41SPM).

69. The BS of claim 65, wherein the information includes WLL_INCL field set "1" in one of registration message, origination message, or page response message.

70. The BS of claim 69, wherein the information further includes a desired slot cycle duration in a SLOT_CYCLE_INDEX field.

71. The BS of claim 69, wherein the information further includes a desired slot cycle duration in a WLL_DEVICE_TYPE field.

72. The BS of claim 65, wherein the information includes a SLOT_CYCLE_INDEX with a most sigificant bit of "1" in one of registration message, origination message, or page response message.

* * * * *